July 26, 1966    L. M. O. CYMBALISTY    3,262,218
TREATING APPARATUS

Filed April 12, 1963    4 Sheets-Sheet 1

INVENTOR
LUBOMYR M. O. CYMBALISTY

BY Beale and Jones
ATTORNEYS

July 26, 1966  L. M. O. CYMBALISTY  3,262,218
TREATING APPARATUS
Filed April 12, 1963  4 Sheets-Sheet 2
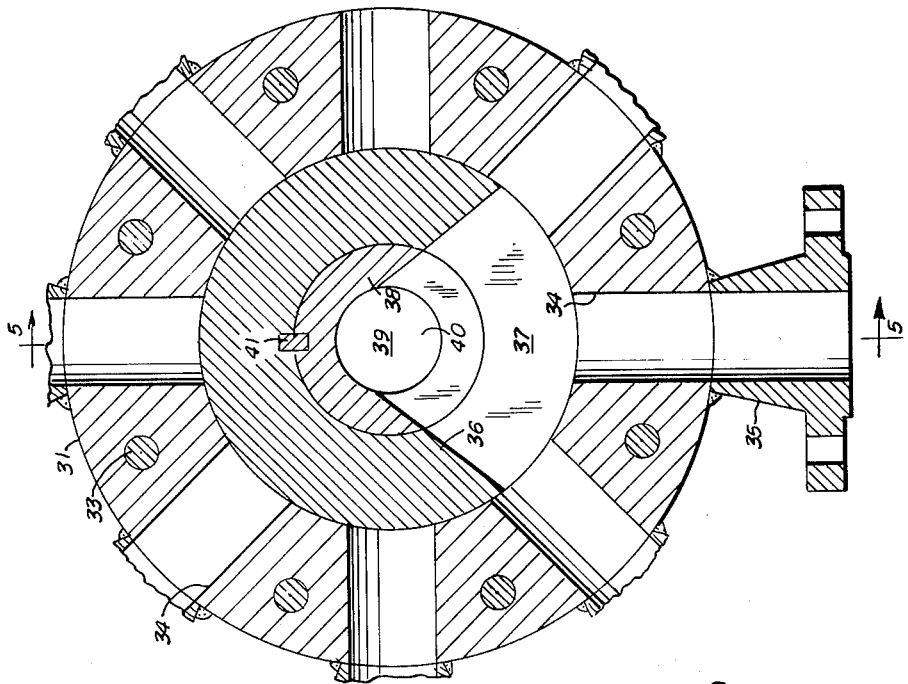
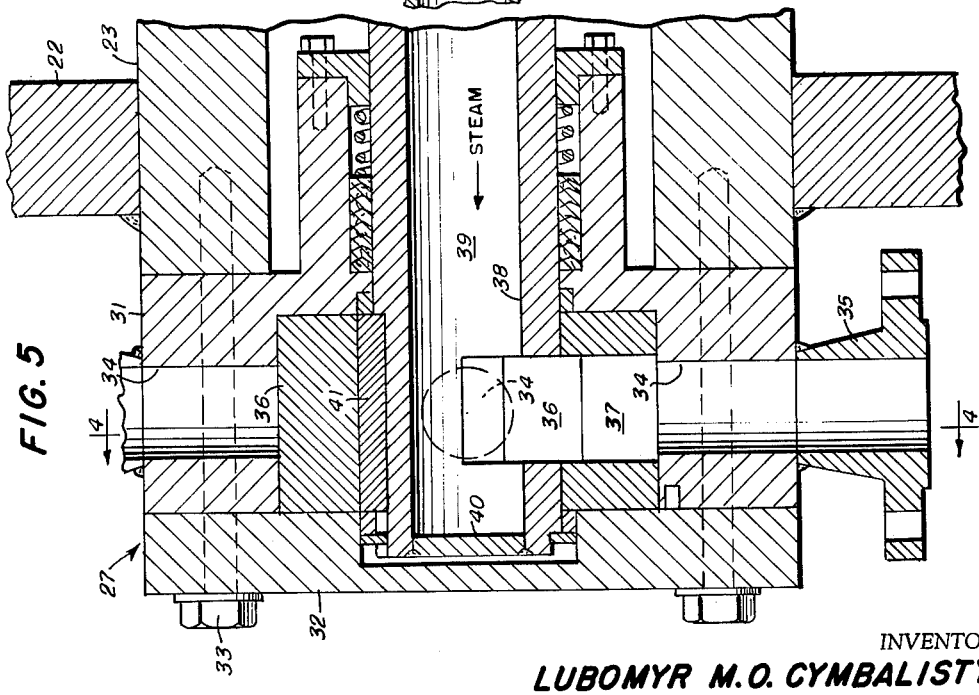
INVENTOR
LUBOMYR M.O. CYMBALISTY
BY Beale and Jones
ATTORNEYS

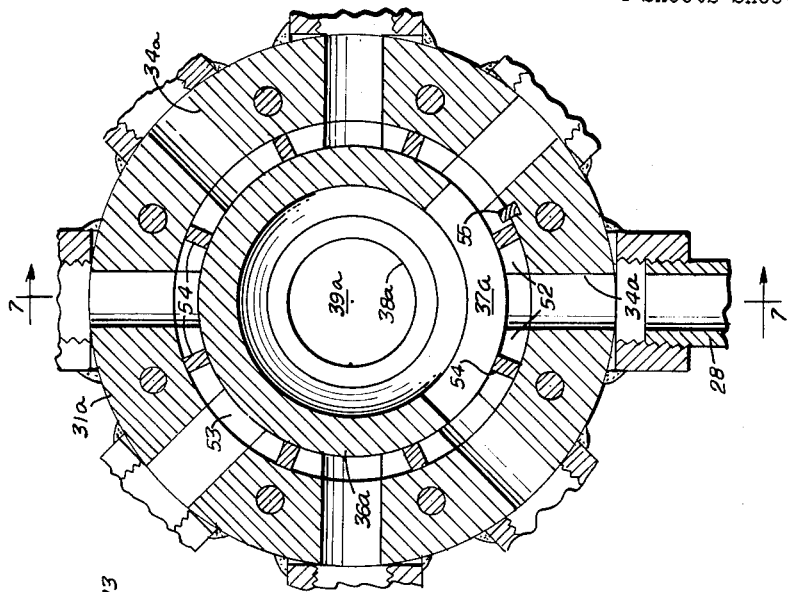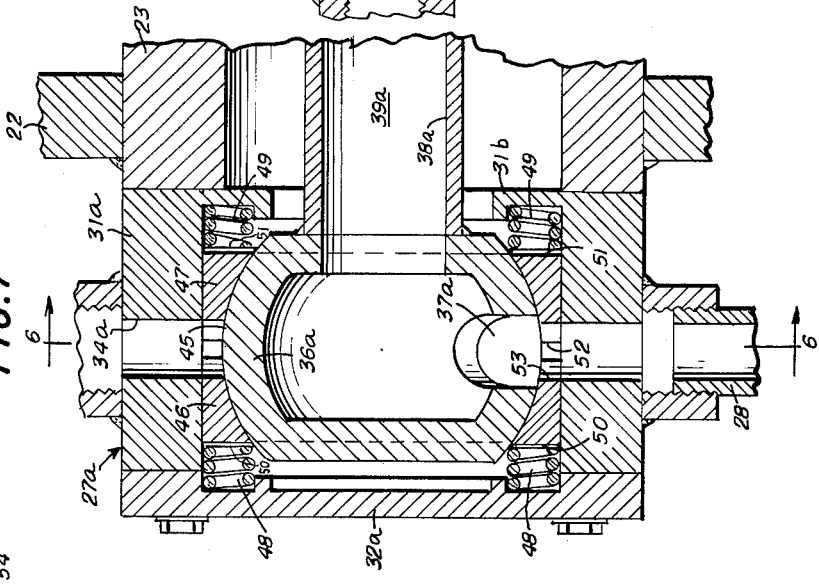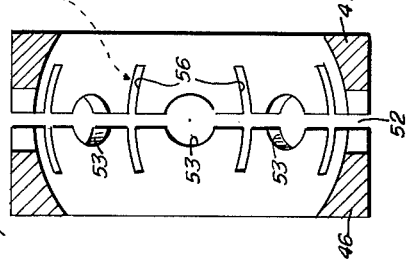

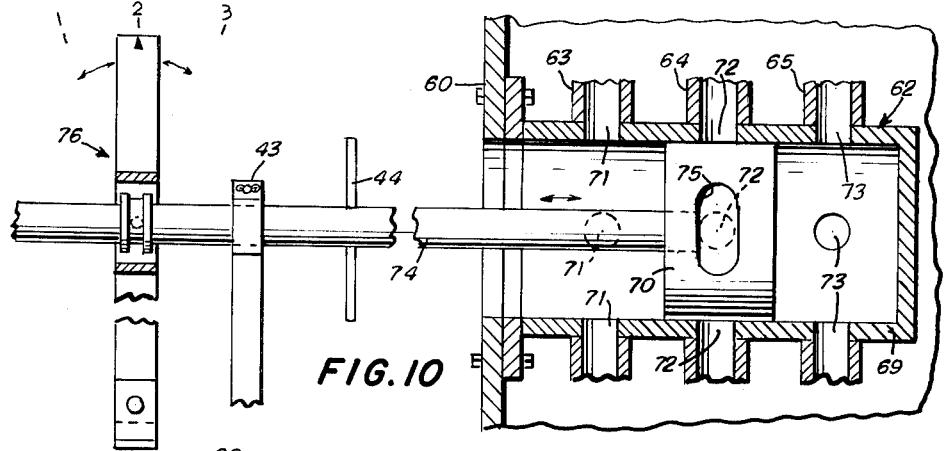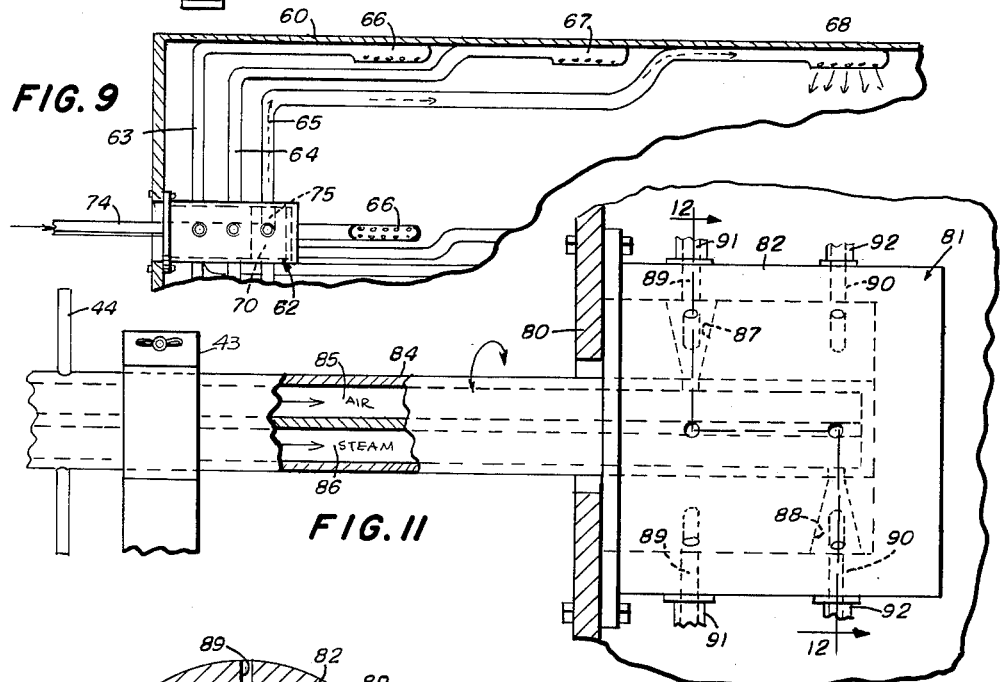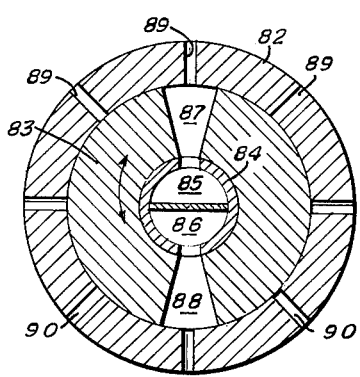

United States Patent Office 3,262,218
Patented July 26, 1966

3,262,218
TREATING APPARATUS
Lubomyr M. O. Cymbalisty, Edmonton, Alberta, Canada, assignor, by direct and mesne assignments, of thirty percent to Cities Service Athabasca, Inc., a corporation of Delaware, thirty percent to Imperial Oil Limited, a corporation of Canada, thirty percent to Atlantic Richfield Company, a corporation of Pennsylvania, and ten percent to Royalite Oil Company, Limited, a corporation of Canada
Filed Apr. 12, 1963, Ser. No. 272,702
4 Claims. (Cl. 34—124)

This invention relates to apparatus for treating materials, and more specifically to rotatory apparatus for treating materials with a fluid or fluids.

One object of the invention is to provide simple means for supplying fluid to or removing it from a selected portion of a rotating drum or the like, in timed relation to the rotation of the drum and therefore independent of the rotation thereof.

Another object is to provide means for supplying different fluids simultaneously to different selected locations in a rotating vessel.

Another object of the invention is to provide means for changing the point to which fluid is supplied within a rotating treating vessel either axially or radially or both, without interrupting the rotation of the vessel.

The above and other objects and advantages of the invention will be apparent from the following description and from the appended drawings.

FIGURE 4 is an enlarged fragmentary section taken on line 4—4 of FIGURES 1 and 5.

FIGURE 5 is a section taken on line 5—5 of FIGURE 4.

FIGURES 6 and 7 show a preferred modification corresponding to FIGURES 4 and 5 respectively.

FIGURE 8 is a view of parts of the assembly of FIGURES 6 and 7.

FIGURE 9 is a fragmentary longitudinal section illustrating another embodiment of the invention.

FIGURE 10 is an enlarged fragmentary longitudinal section of FIGURE 9, indicating in addition means for adjustment and control, and with valve member 70 shown in a different position.

FIGURE 11 is a longitudinal elevation illustrating a fragmentary portion of an other embodiment of the invention.

FIGURE 12 is a section taken on line 12—12 of FIGURE 11.

Figure 1:
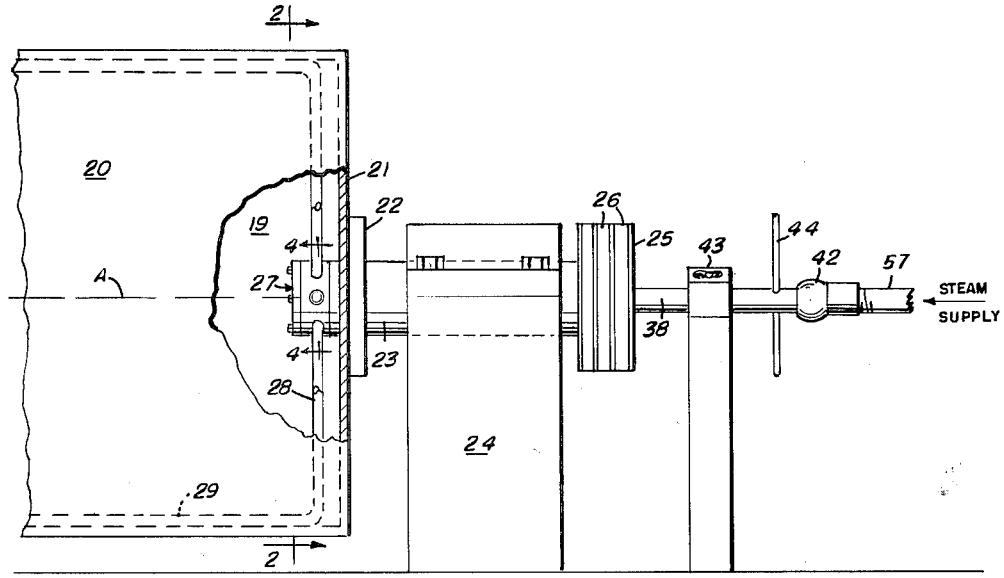
FIGURE 1 is a fragmentary view in elevation, with a portion broken away, illustrating one form of the invention.
Figure 2:
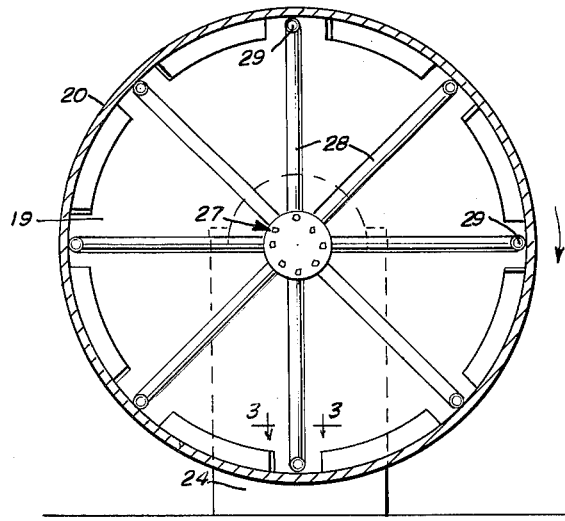
FIGURE 2 is a section taken on line 2—2 of FIGURE 1.

Referring now to the drawing, in which like characters indicate the same or similar parts, FIGURES 1 and 2 show a rotary drum 20 enclosing a chamber 19 and mounted for rotation about its longitudinal and horizontal axis A. Drum or shell 20 has an end wall 21 connected by a flange 22 to a tubular hub 23 which constitutes a hollow cylindrical journal, journaled in a bearing in end support 24. A pulley 25, fixed to the end of hub 23, and a drive belt 26 provide means for rotating drum 20 by a motor, not shown.

Figure 3:
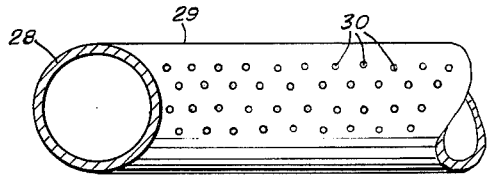
FIGURE 3 is a fragmentary view to enlarged scale taken on line 3—3 of FIGURE 2.

Referring more particularly to FIGURES 4 and 5, a distributor valve, generally designated 27, is mounted on the inner end of hub 23, within drum 20. As best shown in FIGURE 2, radial pipes 28 extend outwardly from distributor valve 27 to the inner cylindrical surface of the drum and then, as indicated in FIGURE 1, axially along the drum, being fixed thereto. These axial extensions of pipes 28 are designated 29, and as illustrated in FIGURE 3 they are perforated along the sides facing the drum center, as indicated at 30, or at other suitable locations around their peripheries. Valve 27 comprises a first rotary valve member 31 which, together with a cover plate 32, is fixed by means of studs 33 to hub 23, and hence to drum 20. Rotary valve member or casing 21 has circumferentially spaced radial ports 34, one connecting with each radial pipe 28 by means of a suitable connection such as flange 35.

Valve 27 also comprises a second rotary valve member 36 secured by a key 41 to the inner end of a pipe 38 which extends through hub 23 from an external source of steam or other fluid as illustrated in FIGURE 1. Preferably, this source of supply comprises a pipe 57 fastened by a swivel joint 42 to the outer end of pipe 38. The inner end of pipe 38 is closed by a plate 40 and has a radial port 37. Thus, pipe 38 provides a fluid passageway 39 from an exterior source 57 to a port 37 which is fixed in a selected rotary position by means of a clamp 43. Suitable adjusting means, indicated schematically by handles 44, is provided for rotating pipe 38 for adjusting second rotary valve member or valve plug 36 in rotation to bring valve port 37 to a selected rotational position. As shown in FIGURE 4, port 37 is formed with a sufficiently wide angle to supply several adjacent ports 34 of first rotary valve member 31. Thus, in the illustrated position of second rotary valve member 36, fluid passage 39 is connected to the three lowermost ports 34, and therefore to the three lower radial pipes 28 and connected distributor pipes 29.

As drive means 25, 26 rotates drum 20 around axis A, carrying with it first rotary valve member 31, successive ports 34 are brought abreast valve port 37 so that, in the illustrated position of second rotary valve member 36, steam or other fluid from source of supply 57 will be supplied continuously to the lower portion of drum 20. In this way material placed in drum 20 for treatment, and occuping the lower portion of the drum, will be subjected to fluid forced in through distributor pipes 29 in the lower portion of the drum.

For apparatus subjected to heavy vibration I prefer the spherical valve 27a illustrated in FIGURES 6, 7 and 8 in place of the cylindrical type shown in FIGURES 4 and 5. In this embodiment the second rotary valve member 36a has an outer spherical surface 45, and first rotary valve member 31a is provided with a pair of floating spherical bearings 46, 47 having concave spherical bearings surfaces urged against spherical surface 45.

The floating bearings 46, 47 fit between an inner cylindrical surface of first valve member 31a and the outer spherical surface 45 of valve member 36a and are urged toward each other and against spherical surface 45 by two sets of axially extending springs 48, 49 disposed around the circumference of members 46, 47, on the outer sides of the latter and bearing at their outer ends respectively against cover plate 32a and an annular portion 31b of rotary valve member 31a. The inner ends of each set of springs are secured, as by welding, to spring retaining rings 50, 51 respectively which in turn bear on the outer opposite surfaces of bearings 46, 47. The respective springs thus urge the bearing members 46, 47 against the outer convex spherical surface 45 of second rotary valve member 36a. A locking key 55 secures spherical bearing members 46, 47 against rotation with respect to first rotary valve member 31a.

In operative position bearing members 46, 47 are spaced apart by a space 52 which provides an annular slot. This space is enlarged, opposite each of the ports 34a in valve member 31a, as indicated at 53. To prevent the fluid from passing through slots 52 between ports 34a a block-off key 54 is provided between each adjacent pair of enlarged apertures 53, these block-off keys fitting in slots 56 formed in members 46, 47 and opening into slots 52. Thus, as shown in FIGURE 6, block-off keys 54 separate the adjacent ports 34a, and as in the embodiment of FIGURE 4, the embodiment of FIGURE 6 provides connection between fluid passage 39a and the three lower radial pipes 28 and their connected distributor pipes 29 in the lower portion of the drum, for the illustrated position of port 37a. Except as specifically described for FIGURES 6–8, this embodiment has the same structure and means as illustrated in FIGURES 1, 2, 3 and described above.

FIGURES 9 and 10 schematically illustrate another embodiment of my invention, comprising a rotary drum 60 mounted and driven in the same manner as illustrated and described for FIGURE 1, the hollow hub support and drive means being omitted to simplify FIGURES 9 and 10. Angularly arranged around the inside of drum 60 are a plurality of sets of distributor pipes connecting a distributor valve 62 with sets of axially aligned and axially spaced distributor nozzles. One such set of pipes 63, 64, 65 is shown leading to respective nozzles 66, 67, 68 in the top of the drum. Similar sets are spaced angularly about the inside of the drum at desired intervals. Distribution valve 62 comprises a cylindrical first rotary valve member 69 fixed to drum 60, and a second rotary valve member mounted for rotary and axial sliding movement therein. Valve member 69 has an inner cylindrical surface connected by suitable ports with the respective pipes, such as 63, 64, 65, these ports being disposed in axially aligned sets as illustrated, the sets being angularly disposed around the cylindrical casing of valve member 69. Thus, as illustrated in FIGURE 10, at the top of valve member 69 is a set of axially aligned ports 71, 72, and 73 connecting respectively with the upper set of distributor pipes 63, 64 and 65. Additional axially aligned sets of ports 71, 72, and 73 are angularly spaced around the cylindrical body of valve member 69, connecting respectively with similar sets of axially aligned nozzles 66, etc., only one such additional distributor nozzle 66 being shown, but, as indicated above, the respective pipes connect with spaced sets of nozzles 66, 67, and 68 respectively. The ports in valve member 69 are arranged in axially spaced sets of ports 71, ports 72, and ports 73 respectively disposed in axially spaced parallel planes as shown.

It will be seen that the set of valve ports 71 in the left hand portion of valve member 69 connect respectively with nozzles 66 in the left hand portion of drum 60, that the set of ports 72 in the central portion of valve member 69 connect with nozzles 67 in the central portion, and that the set of ports 73 in the right hand portion of valve member 69 connect with nozzles 68 in the right hand portion.

The second rotary valve member 70 is mounted on the inner end of a pipe 74, which is connected at its outer end with an external fluid moving means (not shown) for supplying treating fluid to drum 60. The inner end of pipe 74 is connected with a port 75 in valve member 70. Clamp means, indicated schematically at 43, is provided for holding second rotatory valve member 70 in selected position both rotationally and longitudinally along the axis of first rotary valve member 69. Means, indicated schematically at 76 is provided for moving pipe 74 and valve member 70 longitudinally. Thus, means 76 may be moved longitudinally to indicated positions 1, 2, or 3 to align port 75 with sets of ports 71, 72, or 73 respectively, to connect the external source of fluid with the longitudinal region of the drum in which nozzle sets 66, 67, or 68 are located. Means 76 may also be used to cut off or adjust the flow to the internal nozzles by regulating the exact longitudinal position of ports 75. The rotational position of port 75 may also be adjusted by suitable means such as handles 44 so as to control the angular portion of the drum space to which fluid is supplied as the drum is rotated. Thus, in FIGURE 9 the rotational position of second rotary valve member 70 is indicated with ports 75 directed upwardly to supply the right hand set of pipes 65 and nozzles 68 as they come into the top position, and fluid will therefore be supplied to the top right hand portion of the drum at 68. In FIGURE 10 valve member 70 is shown opposite the intermediate pipes 64 and port 75 is shown in a horizontal position pointing toward the viewer, so that in this indicated position fluid will be supplied to the near part of the central section of the drum by nozzles 67 as their respective pipes 64 come abreast port 75.

FIGURES 11 and 12 schematically illustrate still another embodiment of my invention which is similar to the embodiment of FIGURES 1–5 except that its drum has two sets of radial pipes terminating in axially extending distributor pipes (such as 28, 29 of FIGURES 1 and 2) supplied through a double distributor valve (like that shown in FIGURES 4 and 5 except that it has two axially spaced sets of ports), and a divided or double fluid supply pipe. The drum, a fragmentary end wall portion which is indicated at 80, is mounted and driven in the same manner as illustrated and described for FIGURE 1, the hollow hub, support, and drive means being omitted to simplify FIGURE 11. Distributor valve 81 comprises a first rotary member 82 rigidly secured to and rotating with drum 80, and a second rotatory valve member 83 rotatably mounted in member 82. Rotatory valve member 83 is fixedly mounted on the inner end of a divided or double fluid supply pipe 84 having upper and lower fluid supply channels 85 and 86 which are connected at the outer end of supply pipe 84 with separate sources of fluid supply which may, for example, be respectively air and steam, as indicated in FIGURE 11. Second rotatory valve member 83 is provided with axially spaced ports 87 and 88 extending radially in opposite directions from pipe 84 and connecting the outer cylindrical surface of valve member 83 with fluid channels 85 and 86 respectively. Extending through the cylindrical wall of first rotatory valve member 82, and axially alined with port 87, is a series radial ports 89, spaced around the wall of rotatory valve member 82 as best shown in FIGURE 12. A similar set of radial ports 90 is formed in rotatory valve member 82 in axial alignment with port 88. Extending radially from each port 89 is a pipe 91 extending outwardly to the cylindrical drum in the same fashion as pipes 28 in FIGURE 2 and each connects with an axially extending distributor pipe such as illustrated at 29 in FIGURES 1 and 3. Similarly, extending from each port 90, is a radial pipe 92 which extends outwardly to another axially extending distributor pipe such as indicated at 29 in FIGURES 1 and 3, the distributors extending longitudinally on the inner surface of the drum from pipes 91 and 92 being disposed closely adjacent each other in pairs.

It will thus be seen that as drum 80 is rotated air supplied through fluid channel 85 will pass through port 87 and through an aligned port 89 in valve member 82 to flow upwardly through the connected pipe 91 so as to be distributed in the top of the drum, and steam supplied through channel 86 will be distributed similarly in the bottom of the drum. It will be understood that ports 87 and 88 may be made broader than illustrated in FIGURE 12, and that the numbers of ports 89 and 90 may be increased as desired to obtain the proper supply of steam and air to the drum. Valve member 83 may also be adjusted in rotation as indicated by the double arrows in FIGURES 11 and 12, utilizing handle 44 and clamp 43.

If desired, instead of supplying fluid to the drum, suction may be applied to any of the "fluid supply channels."

It will be seen that I have provided simple and rugged apparatus which is suitable for a variety of applications, such as tumblers, mixing drums, vacuum filters, etc.

Modifications within the scope of the appended claims will be obvious to those skilled in the art.

I claim:
1. Apparatus for fluid treatment of material comprising: an enclosed chamber defined by a rotary drum, said drum being rotatable about a longitudinal axis through its center, means for rotating said drum around said axis, a first rotary valve member coaxial with said axis, fixed to and rotating with said drum, said member having a plurality of ports angularly spaced around said axis and in the same plane perpendicular to said axis, a plurality of fluid passages fixed in said drum, one for each of said ports, each passage connecting the respective port with said chamber at a certain angular position around said axis and on said drum, the respective positions being spaced angularly around said axis, a second rotary valve member coacting with said first rotary valve member, coaxial therewith, and having a valve port, said valve members having coacting spherical surfaces, and means resiliently urging said spherical surfaces together, whereby said valve members maintain resilient contact during vibration and axial misalignments therebetween,, means for holding said secondary rotary valve member in fixed position with its valve port axially abreast said plurality of ports for sequential connection therewith when said drum rotates, and a fluid passage for connecting the valve port of said secondary rotary valve member with an external fluid moving means, whereby as said drum rotates said external fluid moving means will be connected sequentially with said chamber at the successive angular positions of said drum, which positions correspond in succession with a portion of said chamber which is angularly fixed with respect to said valve port.

2. Apparatus as defined by claim 1, comprising means for adjusting said second rotary valve member about said axis to control the position of its valve port in rotation and thereby control the angular portion of said chamber connected to said external fluid moving means.

3. Apparatus for fluid treatment of material comprising: an enclosed chamber defined by a rotary drum, said drum being rotatable about a longitudinal axis through its center, means for rotating said drum around said axis, a first rotary valve member coaxial with said axis, fixed to and rotating with said drum, said member having a plurality of ports angularly spaced around said axis and in the same plane perpendicular to said axis, a plurality of fluid passages fixed in said drum, one for each of said ports, each passage connecting the respective port with said chamber at a certain angular position around said axis and on said drum, the respective positions being spaced angularly around said axis, a second rotary valve member coacting with said first rotary valve member, coaxial therewith, and having a valve port, one of said rotary valve members having a concave cylindrical surface, the other having a convex cylindrical surface fitting within said concave cylindrical surface, a second plurality of ports in said first rotary valve member, angularly spaced around said axis in a plane parallel to and spaced from the other plurality of ports, a second plurality of passages fixed in said drum, one for each of said second plurality of ports, each passage connecting the respective ports with said chamber at a certain angular position around said axis and on said drum, the respective positions being spaced angularly around said axis, said second plurality of passages connecting with said chamber in one axial region thereof and the first named of said plurality of passages connecting with said chamber in a different axial region thereof, means for adjusting said second rotary valve member axially relative to the first rotary valve member to align the valve port of the former with either one of said pluralities of ports in said first rotary valve member, means for holding said second rotary valve member in fixed position with its valve port axially abreast one of said plurality of ports for sequential connection therewith when said drum rotates, and a fluid passage for connecting the valve port of said secondary rotary valve member with an external fluid moving means, whereby as said drum rotates said external fluid moving means will be connected sequentially with said chamber at the successive angular positions of said drum and selectively with different axial regions of said chamber.

4. Apparatus as defined by claim 3, comprising means for adjusting said second rotary valve member about said axis to control the position of its valve port in rotation and thereby control the angular portion of said chamber connected to said external fluid moving means.

References Cited by the Examiner
UNITED STATES PATENTS

| | | | |
|---|---|---|---|
| 535,560 | 3/1895 | Schmiedecke et al. | 34—138 |
| 2,027,652 | 1/1936 | Raisch | 210—404 |

FREDERICK L. MATTESON, JR., *Primary Examiner.*

WILLIAM F. O'DEA, *Examiner.*

A. D. HERRMANN, *Assistant Examiner.*